(12) United States Patent
Laubrock et al.

(10) Patent No.: US 7,501,798 B2
(45) Date of Patent: Mar. 10, 2009

(54) METHOD FOR THE ACTIVE DAMPING OF THE DRIVE TRAIN IN A WIND ENERGY PLANT

(75) Inventors: Malte Laubrock, Hamburg (DE); Thomas Paul Woldmann, Hamburg (DE); Soren Bilges, Verden (DE)

(73) Assignee: Nordex Energy GmbH, Norderstedt (DE)

( * ) Notice: Subject to any disclaimer, the term of this patent is extended or adjusted under 35 U.S.C. 154(b) by 83 days.

(21) Appl. No.: 11/775,984

(22) Filed: Jul. 11, 2007

(65) Prior Publication Data

US 2008/0265846 A1 Oct. 30, 2008

(30) Foreign Application Priority Data

Apr. 27, 2007 (DE) .................. 10 2007 019 907

(51) Int. Cl.
 *H02P 9/44* (2006.01)
(52) U.S. Cl. .................. 322/32; 322/24; 322/29; 322/52
(58) Field of Classification Search .................. 322/22, 322/24, 29, 32, 52
 See application file for complete search history.

(56) References Cited

U.S. PATENT DOCUMENTS 6,781,331 B2 * 8/2004 Mokri et al. ................. 318/157
6,933,705 B1 * 8/2005 Howes ......................... 322/29
7,215,099 B2 * 5/2007 Ylppo et al. .................. 322/29
2006/0232250 A1 10/2006 Sihler et al.

FOREIGN PATENT DOCUMENTS

EP 1 643 122 A2 7/2005
WO 2004/112234 A1 12/2004

OTHER PUBLICATIONS

Chapter 11.2.4 "Excitations and Resonances", by Erich Hau, Windkraftanlagen, 3rd Edition, Springer-Verlag Berlin, pp. 400-402.

* cited by examiner

*Primary Examiner*—Nicholas Ponomarenko
*Assistant Examiner*—Iraj A Mohandesi
(74) *Attorney, Agent, or Firm*—Vidas, Arrett & Steinkraus, P.A.

(57) ABSTRACT

A method for the active damping of a drive train in wind energy plant, with the following steps: the actual value of the generator rotational speed is acquired and amplified via an oscillatory delay element, the oscillatory delay element has a predetermined natural oscillation frequency ($\omega_E$), which is smaller than the smallest natural frequency of the drive train, and a difference between the actual value of the rotational speed and the amplified value for the rotational speed is connected to a controller as actuating variable, which determines a correction moment for a generator control.

9 Claims, 1 Drawing Sheet

METHOD FOR THE ACTIVE DAMPING OF THE DRIVE TRAIN IN A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for the active damping of vibrations on and/or in a drive train of a wind energy plant.

With drive train is usually meant the assembly of rotor, rotor shaft (slow shaft), gearbox, generator shaft (fast shaft), coupling and generator. For wind energy plants, it is commonly known that the vibration excitations of the drive train may have different causes. First of all, circulation periodic disturbances are a possibility, like tower wind shelter or tower dam, height profile of the wind speed, skew upwind of the rotor through yaw angles or skew axis inclinations and/or unbalanced masses of the rotor blades. Besides to the outer excitations, which occur as multiples of the rotor's rotational speed, disturbances at the generator side also occur, like grid errors, electric grid oscillations at very long grid feed lines, oscillations of converters and DC intermediate circuits, control influences and consumer retroaction in the isolated operation. An overview about the vibration excitation and the resonances occurring with it is found in the textbook of Erich Hau, Windkraftanlagen, $3^{th}$ edition, Springer-Veilag Berlin, chapter 11.2.4, the entire contents of which is incorporated herein by reference.

From WO 2004/112234 A1, the entire contents of which is incorporated herein by reference, a method for damping a torsional vibration on a rotating drive train is known. A damping device is provided for damping in this, which is tuned to a resonance frequency of the torsional vibration. The tuning must not deviate more than 3% from the resonance frequency of the drive train.

From EP 1 643 122 A2, the entire contents of which is incorporated herein by reference, a damping system for wind energy plants with variable speed is known. The damping system acquires the actual value of the rotational speed at the generator shaft. The actual value is forwarded to a control unit, which depending from the rotational speed determines a desired value for the torque on the generator. In order to avoid vibrations, a vibration damper is provided, the parameters of which are adapted depending from the resonance frequency of the drive train, a resonance for tower vibrations and from the movement of the rotor blade past the tower. A signal is connected to the vibration damper as an input, which is a measure for the generator rotational speed and which is amplified in order to generate a response signal. In order to adapt the vibration damper, a detection device is provided, which continuously calculates the resonance frequency of the tower and of the drive train and forwards the calculated values to the damper. In doing so, the detection device periodically scans the generator rotational speed. Vibrations cause changes of the generator rotational speed, which are transformed from the time region into the frequency region by the detection device. The frequency signals are forwarded to the vibration damper.

The present invention is based on the objective to provide a method for the active drive train damping, which reliably permits a damping with simple means.

BRIEF SUMMARY OF THE INVENTION

The method according to the present invention is provided for the active damping of a drive train in a wind energy plant. In the method, the actual value of the generator rotational speed is acquired and amplified via an oscillatory delay element. The oscillatory delay element has a natural oscillation frequency which is smaller than the smallest natural frequency of the drive train. The difference between actual value and amplified value for this rotational speed is connected to a controller as actuating variable, which determines a correction moment for a generator control unit. In the method according to the present invention, a predetermined natural oscillation frequency is provided for the oscillatory delay element, which is preset for a wind energy plant or a family of wind energy plants.

The predetermined natural oscillation frequency permits to omit an adaptive matching of the delay element during the operation of the plant.

In order to determine the correction moment, a controller is provided in the method according to the present invention, to which the difference value between the actual value of the rotational speed and the amplified value of the rotational speed is connected. For the method according to the present invention, it has been surprisingly found that this can be applied without adjustment of the parameters to the oscillatory delay element as well as to the controller in wind energy plants which have different components.

In one preferred embodiment, the oscillatory delay element has a predetermined natural oscillation frequency which is at least 8%, preferably 12% smaller than the smallest natural frequency occurring at the drive train. Through the selection of the predetermined natural oscillation frequency on the oscillatory delay element, it is made sure on the one hand that changes of the rotational speed, which occur through wind gustings or through the intervention of a pitch system, for instance, do not lead to the generation of a correction moment for the generator control unit. On the other hand, through the selection of the natural oscillation frequency it is made sure that resonance vibrations are damped in time and too high stresses for the drive train and its components are avoided.

In one preferred embodiment, the oscillatory delay element is realised as a PT2 element. Preferably, a small damping constant D is selected for the oscillatory delay element, the value of which is preferably in the region of 0,05 to 0,25. Even in the selection of the damping constant, it was found that with a predetermined value for the damping constant, an effective vibration damping is possible for wind energy plants with different components.

Preferably, the controller for the determination of the correction moment is realised as a PID-controller, wherein the PID-controller can also be realised as a proportional controller in which the differential portion (D-portion) and/or the integral portion (I-portion) are set to zero.

The method according to the present invention will be explained in more detail by means of an example in the following.

DETAILED DESCRIPTION OF THE INVENTION

Figure 1:
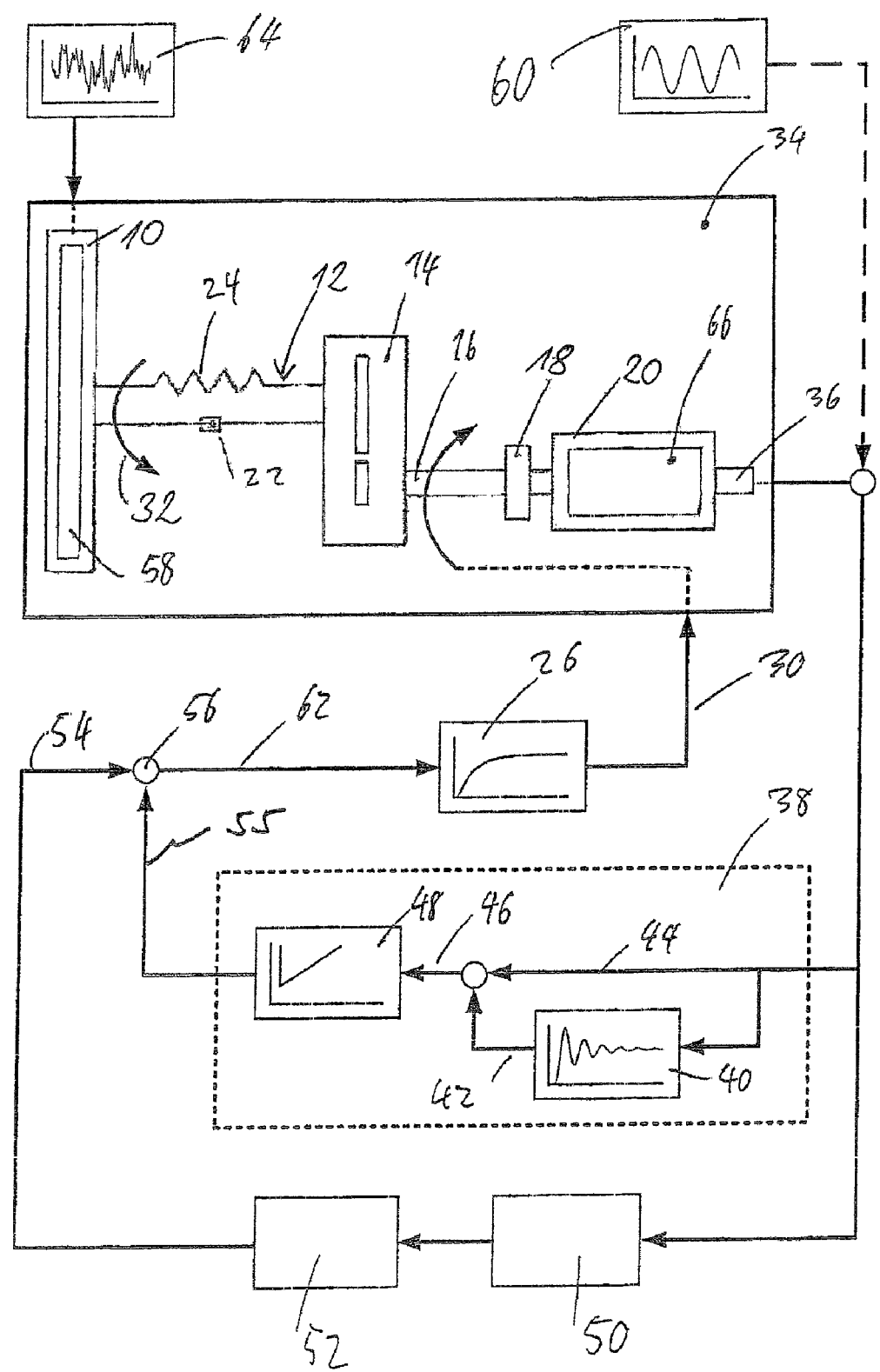
FIG. 1 shows elements of the drive train and the basic structure of the controller circuit in a schematic view.

While this invention may be embodied in many different forms, there are described in detail herein a specific preferred embodiment of the invention. This description is an exemplification of the principles of the invention and is not intended to limit the invention to the particular embodiment illustrated.

FIG. 1. shows the configuration of essential elements of the drive train 34 of a wind energy plant in an overview. The rotor, consisting of rotor blades and a rotor hub housing is schematically represented with 10. Through the action of the wind 64 on the rotor 10, a rotor torque 32 is generated and the rotor side shaft 12 is driven. The rotor shaft 12 runs out into a gearbox 14, the output shaft of which is called the generator shaft 16. The generator shaft 16 is connected with an input shaft of the generator 20 via a coupling 18. For the sake of better understanding of the occurring vibrations on the drive train, the rotor shaft can be assumed to be elastic, which is represented in the figure through a damping element 22 and an elastic spring 24. For the present considerations, important is the occurring torsional vibration at the shaft 12. Spring 24 and damping element 22 are therefore dimensioned for the characterisation of the elasticity of the rotor shaft at torsional vibrations, wherein the magnitudes are to be understood as concentrated equivalent magnitudes of the complete drive train. The gearbox is considered as an ideal transformer, which does not have any elastic properties. In the shown configuration, even the generator shaft 16 can be assumed to be elastic, then the magnitudes have to be converted from the rotor shaft 12 to the generator shaft 16, corresponding to the gear ratio of the gearbox 14. Rotor and generator are considered as two mass moments of inertia, each at a time rotating around its axis.

From this approach result three different moments with have to be taken into consideration for a damping of the drive train. The first moment is the acceleration moment of the mass, which results from the product of mass moment of inertia and angular acceleration. The second moment is the moment of inertia of the spring element, which is the product of the torsional spring stiffness and the angular difference between the ends of the shafts. The third moment is the transmission moment through the damping, which results as the product of the mechanical damping and the difference of the angular speeds at the ends of the shaft.

For better overview, the system of generator and converter 26 is represented as a unit, to which a desired value 62 for the generator moment is connected. Generator/converter 26 are driven correspondingly in order to apply a generator moment 30 ($M_{GEN}$). Also, a rotor moment 32 ($M_R$), originating from the rotor, is connected to the drive train 34. In the represented model, it may be imagined in a simplified manner that the rotor moment $M_R$ acts on the drive train via the mass moment of inertia $J_R$ 58, and the generator moment $M_{GEN}$ acts on the moment of inertia $J_{GEN}$ 66 of the generator 20 on the drive train. The acting torques 30 and 22 lead to a rotational speed $N_{GEN}$ 44, which is measured with a rotational speed sensor 36. The rotational speed 44 is forwarded to a controller 38, which determines a correction moment 55. The correction moment 55 is subtracted from the desired value 54 for the generator/converter unit. When concretely considering the signs for the moments, it has to be paid attention that a consistent sign convention is observed, in particular also for the moments on the generator/converter and the moments acting on the ends of the drive train.

The rotor moment 32 and the generator moment 30 are connected to the control system formed by the drive train 34. The rotational speed $n_{GEN}$ 44 resulting from this is connected to the controller 38. The controller 38 has a filter 40, which amplifies the connected actual value of the rotational speed. The filter 40 works as an oscillatory delay element, which has a predetermined natural oscillation frequency and a damping constant D. The amplified rotational speed 42 is subtracted from the rotational speed 44 measured on the drive train 34 and is connected to a PID controller 48 as actuating variable 46. For the PID controller 48 it has been found that the differential part and the integral part can be set to zero, so that the PID controller works as a proportional controller. The amplified actuating variable is fed to the desired value for the generator moment as desired control value.

The mode of action of the method according to the present invention can be illustrated particularly well by regarding undesired vibrations as a disturbance 60. In this, the disturbance 60 is a superposition in the rotational speed 44. In the filter 40, the superposed variable is amplified, when it is in the region of the natural oscillation frequency of the filter, so that a regulating variable 46 is connected to the controller 48 and a regulating intervention takes place. When there is no disturbance or a disturbance which is not amplified by the filter 40 due to its frequency, no regulating variable is connected to the controller 48 and a regulating intervention does not take place. By using smaller damping degrees of the PT2 element, it is made sure that an effective limitation to the region of the natural frequency of the drive train is achieved. For an optimum damping result, the entire controller 38 needs a resultant overall amplification of the controller, which is composed of the P-portion of the PID controller and of the amplification of the PT2 element. In the case of small damping portions of the PT2 element, the main portion of the needed amplification is obtained from the resonance rise of the amplitude-frequency-response of the element, and the P-portion of the PID controller makes only a small contribution.

A central control unit of the wind energy plant 50 determines a desired value for the moment. In the process step 52, the desired value is implemented depending from the sign convention of the converter used. The desired value 54 for the generator thus obtained is correspondingly corrected in 56.

For the correction, the actual value of the rotational speed is connected to the filter 40, which is realised as a PT2 element with a damping constant D and an oscillation duration $T_0$ or a natural oscillation frequency $\omega_0 = 2\pi/T_0$, respectively. The signal 42 thus amplified is subtracted from the original actual value 44 and subsequently proportionally amplified in the controller 48 with a factor $K_p$. The amplified signal 55 is then added to or subtracted from the desired value of the generator moment, corresponding to the sign convention selected in 52. The resultant value 62 is the desired value, which is connected to the converter/generator.

The natural oscillation frequency $\omega_E$ for the filter 40 results from the following expression:

$$\omega_E = \frac{2\pi}{T_0}\sqrt{1 - D^2}$$

According to the present invention, it is preferably worked with a damping constant D in the region of 0,1 to 0,2. The oscillation time $T_0$ or the characteristic angular frequency $$\omega_0 = \frac{2\pi}{T_0}$$

respectively, as well as the damping constant D, are selected such that the natural oscillation frequency $\omega_E$ is at least 10% smaller than the smallest natural oscillation frequency of the drive train. For stable parametrisation of a family of plants, the setting takes place typically in the region 20% smaller than the smallest natural oscillation frequency of the drive train.

| List of reference numerals: |
| --- |
| 10 rotor |
| 12 rotor shaft/slow shaft |
| 14 gearbox |
| 16 generator shaft/fast shaft |
| 18 coupling |
| 20 generator |
| 22 damping element |
| 24 elastic spring |
| 26 system generator/converter |
| 30 generator moment |
| 32 rotor torque |
| 34 drive train |
| 36 rotational speed sensor |
| 38 controller |
| 40 delay element (PT2 element)/filter |
| 42 rotational speed (value after amplification/delay) |
| 44 rotational speed (measurement value of the rotational speed sensor) |
| 46 actuating variable |
| 48 controller (P/PD/PI/PID element) |
| 50 control unit of the wind energy plant |
| 52 sign conversion |
| 54 desired value of the moment (from control) |
| 55 correction moment |
| 56 desired value correction |
| 58 mass moment of inertia $J_R$ |
| 60 disturbance |
| 62 desired value for the generator moment |
| 64 wind |
| 66 mass moment of inertia $J_{GEN}$ |

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for the active damping of a drive train in a wind energy plant, with the following steps: the actual value of the generator rotational speed (36) is acquired and amplified via an oscillatory delay element (40), the oscillatory delay element (40) has a predetermined natural oscillation frequency ($\omega_E$), which is smaller than the smallest natural frequency of the drive train, and a difference between the actual value of the rotational speed (36) and the amplified value for the rotational speed (42) is connected as actuating variable (46) to a controller (48), which determines a correction moment (55) for a generator control unit.

2. A method according to claim 1, characterised in that the oscillatory delay element (40) has a natural oscillation frequency which is at least 8%, preferably 12% smaller than the smallest natural frequency occurring at the drive train.

3. A method according to claim 1, characterised in that the oscillatory delay element (40) is realised as a PT2-element.

4. A method according to claim 3, characterised in that the oscillatory delay element (40) has a small damping constant of less than 0,5.

5. A method according to claim 4, characterised in that the damping constant is 0,05 to 0,25.

6. A method according to any claim 1, characterised in that the controller (48) is realised as a PID-controller.

7. A method according to claim 1, characterised in that the controller is realised as a proportional controller (P-controller).

8. A method according to claim 1, characterised in that the controller is realised as a proportional-plus-integral controller (PI-controller).

9. A method according to claim 1, characterised in that the controller is realised as a proportional-plus-derivative controller (PD-controller).

* * * * *